United States Patent
bin Mohd Yussof et al.

(10) Patent No.: US 9,385,907 B2
(45) Date of Patent: Jul. 5, 2016

(54) DUAL RE-CONFIGURABLE LOGIC DEVICES FOR MIMO-OFDM COMMUNICATION SYSTEMS

(71) Applicant: Telekom Malaysia Berhad, Kuala Lumpur (MY)

(72) Inventors: Zulkalnain bin Mohd Yussof, Puchong Selangor Darul Ehsan (MY); Abdul Aziz bin Abdl Rahman, Ulu Klang Kuala Lumpur (MY); Ishak bin Suleiman, Kajang Selangor Darul Ehsan (MY); Ahmad Kamsani Samingan, Bandar Baru Bangi Selangor Darul Ehsan (MY)

(73) Assignee: TELEKOM MALAYSIA BERHAD, Kuala Lumpur (MY)

( * ) Notice: Subject to any disclaimer, the term of this patent is extended or adjusted under 35 U.S.C. 154(b) by 32 days.

(21) Appl. No.: 14/286,050

(22) Filed: May 23, 2014

(65) Prior Publication Data

US 2015/0341200 A1    Nov. 26, 2015

(51) Int. Cl.
| | |
|---|---|
| *G01R 31/08* | (2006.01) |
| *H04L 27/26* | (2006.01) |
| *H04B 7/04* | (2006.01) |
| *H04L 27/36* | (2006.01) |
| *H04B 7/10* | (2006.01) |

(52) U.S. Cl.
CPC .......... *H04L 27/2628* (2013.01); *H04B 7/0413* (2013.01); *H04B 7/10* (2013.01); *H04L 27/26* (2013.01); *H04L 27/36* (2013.01); *H04L 27/362* (2013.01)

(58) Field of Classification Search
CPC .............................. H04B 7/216; H04B 7/0413
USPC .......................... 370/206–343; 375/267–299
See application file for complete search history.

(56) References Cited

U.S. PATENT DOCUMENTS

| | | | | |
|---|---|---|---|---|
| 8,571,000 | B2 * | 10/2013 | Zhou | H04L 27/2621 370/344 |
| 2006/0126569 | A1 * | 6/2006 | Jeong | H04L 27/2601 370/335 |
| 2009/0016211 | A1 * | 1/2009 | Gresset | H04L 5/0007 370/210 |
| 2014/0243043 | A1 * | 8/2014 | Shen | H04W 88/10 455/553.1 |

* cited by examiner

*Primary Examiner* — Iqbal Zaidi
(74) *Attorney, Agent, or Firm* — Pearne & Gordon LLP

(57) ABSTRACT

An apparatus and method for dual re-configurable logic devices for MIMO-OFDM communication systems. The apparatus includes two FPGA devices, wherein the FPGA 1 has a centralized processing unit that manages the data flow between both MIMO OFDM modem. The apparatus and method support transmitting and receiving via a plurality of dual-polarized antennas. The modulated transmitted from FPGA 1 uses antenna 1 horizontal polarization to antenna N/2 horizontal polarization and the modulated transmitted from FPGA 2 uses antenna N/2+1 vertical polarization to antenna N vertical polarization.

3 Claims, 4 Drawing Sheets

DUAL RE-CONFIGURABLE LOGIC DEVICES FOR MIMO-OFDM COMMUNICATION SYSTEMS

FIELD OF THE INVENTION

The present invention relates to MIMO-OFDM communication systems and more particularly to a method of using dual re-configurable logic devices for supporting wireless communication.

BACKGROUND OF THE INVENTION

Multiple Input Multiple Output-Orthogonal Frequency Division Multiplexing (MIMO-OFDM) is a highly spectral efficient technology used to transmit high-speed data through radio channels with fast fading, both in frequency and in time. Multiple-Input-Multiple-Output (MIMO) technology has become important in the wireless communication community due to its excellent characteristics. MIMO technology offers significant improvements either through Spatial Multiplexing (SM) mode, or diversity mode. With SM mode, the capacity of the communication channels grow linearly with respect to the number of supported parallel data streams. However the maximum potential of MIMO technology will only be realized in rich scattering conditions.

MIMO has always been proposed together with another important wireless technology referred to as the Orthogonal Frequency Division Multiplexing (OFDM). This multi-carrier technology is essentially a Frequency Division Multiplexing (FDM) scheme. However, contrary to ordinary FDM, the OFDM approach employs a number of closely spaced orthogonal sub-carriers to carry information data. Each sub-carrier is modulated with a conventional modulation scheme at a low symbol rate, hence maintaining total data rates similar to the conventional single carrier modulation schemes in the same bandwidth. OFDM is effective in combating the dispersion effect due to multipath propagation channel which leads to a relatively simple detection scheme.

In wireless communication systems that employ OFDM, a transmitter transmits data to a receiver using many sub-carriers in parallel. The frequencies of the sub-carriers are orthogonal. Transmitting the data parallel allows symbols containing the data to be of longer duration, which reduces the effect of multipath fading. The orthogonality of the frequencies allows the sub-carriers to be tightly spaced while minimizing inter-carrier interference. At the transmitter, the data is encoded, interleaved, and modulated to form data symbols. Overhead information is added, including pilot symbols, and the symbols (data plus overhead) are organized into OFDM symbols. Each OFDM symbol typically uses $2^n$ frequencies. Each symbol is allocated to represent a component of a different orthogonal frequency. An inverse Fast Fourier Transform (IFFT) is applied to the OFDM symbol to generate time samples of a signal. Cyclic extensions are added to the signal and the signal is fed through to a digital to analog converter. Finally the transmitter transmits the signal to the receiver along a channel. When the receiver receives the signal, the inverse operations are performed.

The method of using dual programmable logic devices as one of mechanism of integrated circuit that can be programmed to perform specified logic functions such as MIMO-OFDM system. Another mechanism is ASICs fabrications can similarly be used as mentioned above. The most advantage of using programmable logic devices are fast prototyping development and re-configurable option.

Since the current architecture only implemented in the single chip/device which make it impractical to map the larger design. The inventive step is to map the architecture into multiple devices which can accommodate larger design. The synchronization mechanism between devices are also necessary to make sure the data can communicate with each other accurately.

SUMMARY OF THE INVENTION

This summary is provided to introduce a selection of concepts in a simplified form that are further described below in the detailed description. This summary is not intended to identify key features or essential features of the claimed subject matter.

The present invention provides a method and apparatus for a MIMO OFDM wireless communication system, which is re-configurable onto dual programmable logic devices.

In one aspect, the present invention provides an apparatus for supporting transmitting and receiving via a plurality of dual-polarized antennas.

The transmitter of the MIMO-OFDM system of the present invention comprises of:
  a Forward Error Correcting (FEC) block that serves to provide a means for error correction by adding redundant error correcting codes to the information signal or input data;
  an inter-leaver block that serves to provide a means for enhancing the functionality of the FEC block by redistributing the input data of the information signal across several code words thereby creating a more uniform distribution of error in the event that these errors are picked up in the receiver end of the MIMO-OFDM communication system;
  a Serial to Parallel conversion block that serves to provide a means for parsing or in other words for converting the continuous data into a series of parallel data streams, the number of parallel data streams being equal to the number of available transmitter antennas;
  a plurality of QAM mapping blocks that map the individual parallel data stream of bits on QAM symbols;
  a plurality of OFDM modulators, each OFDM modulator comprising of an Inverse Fast Fourier Transform (IFFT) block and a cyclic prefix block, that further serve to modulate the phase and amplitude of a sub-carrier in accordance to the incoming data stream corresponding to a spatial stream of a MIMO-OFDM transmit antenna and further serves to add a cyclic prefix to the resultant data to thus obtain a time domain OFDM symbol;
  a pilot generator that serves to insert a plurality of pilot tones in the space-time domain of the OFDM symbols;
  a preamble generator block, that generates a preamble according to the requirements of the IEEE 802.11n standard;
  a plurality of multiplexer blocks that serve to add in the time domain a preamble generated by the preamble generator block to the obtained OFDM symbol that is obtained from the OFDM modulator block for each of the individual spatial streams of the MIMO-OFDM transmitter;
  a plurality of Digital Up Sampling blocks that serve to increase the frequency or in other words up sample the resultant spatial stream comprising of the OFDM symbols before transmission to a MIMO-OFDM receiver.

The receiver of the MIMO-OFDM communications system of the present invention comprises of:

a plurality of digital down conversion blocks, that serve to receive the transmitted OFDM symbols of the transmitted MIMO-OFDM information packets to thus down-convert these high frequency signals to intermediate frequency baseband signals;

a timing synchronization block that serves to generate an index to denote the start of an information packet;

a plurality of buffer blocks, to temporarily store the down-converted, received MIMO-OFDM time domain signals before timing synchronization;

a plurality of OFDM demodulator blocks, each block comprising of a Prefix removal block and a Fast Fourier Transform (FFT) block wherein the prefix removal block serves to remove or discard the cyclic prefix and the FFT block serves to demodulate the transmitted MIMO-OFDM time domain symbols into MIMO QAM frequency domain symbols;

a channel estimation block having its inputs connected to the respective outputs of the plurality of OFDM demodulator blocks and its output fed in addition to the output of the plurality of demodulator blocks into a MIMO spatial detector block wherein the channel estimation block performs channel estimation by comparing the received sets of N pilot symbol and received sets of long training field symbols with pilot symbol and long training field symbols known to be transmitted by the transmitter;

a Multiple Input Multiple Output (MIMO) spatial detector block that serves to detect the plurality of spatial streams transmitted which further compensates the effect of channel impairment which has been estimated by the channel estimator block;

a plurality of QAM de-mapper blocks that convert the frequency domain output of the FFT block into time domain information signals by means of demodulation;

a Parallel to Serial data conversion block, that converts the plurality of parallel spatial streams into a serial stream of data bits;

a de-interleaver block; and a Forward Error Correction (FEC) decoder.

In another aspect of the present invention, centralized processing unit is managing data flow between first and second programmable logic devices. Besides controlling both MIMO OFDM modem for transmitting and receiving processes.

DETAILED DESCRIPTION OF THE INVENTION

The detailed description set forth below in connection with the appended drawings is intended as a description of exemplary embodiments and is not intended to represent the only forms in which these embodiments may be constructed and/or utilized. The description sets forth the functions and the sequence for constructing the exemplary embodiments. However, it is to be understood that the same or equivalent functions and sequences may be accomplished by different embodiments that are also intended to be encompassed within the scope of this disclosure.

In MIMO-OFDM systems, the transmitter transmits data through more than one transmitting antenna and the receiver receives data through more than one receiving antenna. The binary data is usually divided between the transmitting antennae, although the same data may be transmitted through each transmitting antenna if spatial diversity is required.

Each receiving antenna receives data from all the transmitting antennae, so if there are M transmitting antennae and N receiving antennae, the signal will propagate over M×N channels, each of which has its own channel response.

Figure 1:
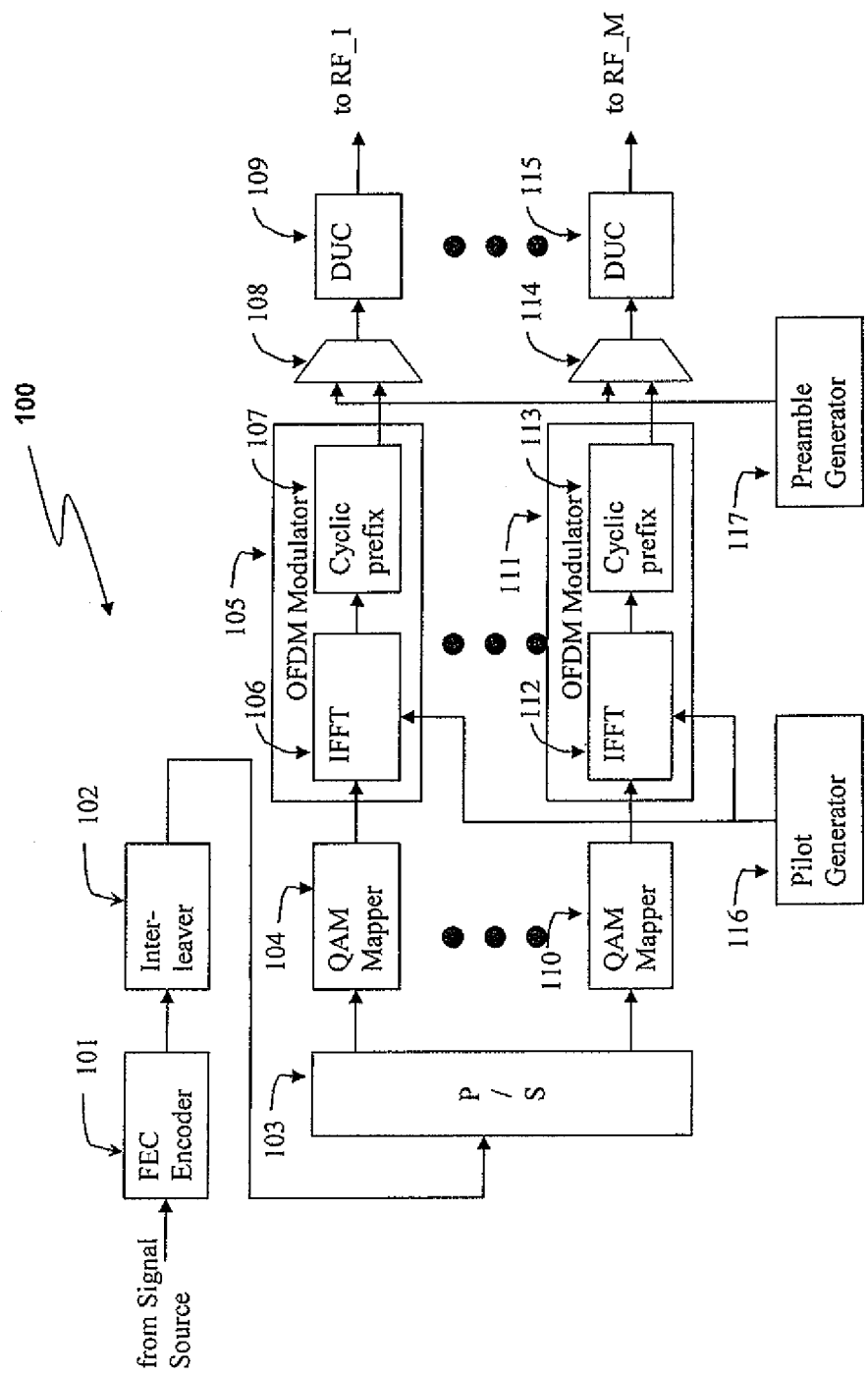
FIG. 1 is a block diagram of MIMO-OFDM transmitter system.

The MIMO-OFDM transmitter 100 of the MIMO-OFDM communications system of the present invention will now be described with reference to FIG. 1. Generally, a MIMO-OFDM transmitter can have a plurality of parallel data streams corresponding to the number of transmit antennas that are available on the transmitter. In a preferable embodiment of the present invention, the number of parallel data streams is constrained to two. The description to follow will thus be based on a MIMO-OFDM transmitter and receiver with a 2×2 channel wherein the transmitter has two antennas and the receiver has two reception antennas.

The MIMO-OFDM transmitter 100 of the present invention comprises of a Forward Error Correction (FEC) block 101, an inter-leaver block 102, a Serial to Parallel converter block 103, a first Quadrature Amplitude Modulation (QAM) mapping block 104, a second QAM mapping block 110, a first OFDM modulator block 105 that includes a first Inverse Fast Fourier Transform (IFFT) block 106 and a first cyclic prefix block 107, a second OFDM modulator block 111 that includes a second IFFT block 112 and a second cyclic prefix block 113, a first multiplexer block 108 and a second multiplexer block 114, a first Digital Up-Sampling (DUC) block 109 and a second Digital Up-Sampling block 115, a pilot generator block 116 and a preamble generator block 117.

Upon receipt of a suitable information signal to be transmitted, this signal is fed to the input of the FEC encoder block 101. The FEC encoder block 101 is the first stage of the transmitter 100. The FEC encoder 101 provides a means for error correction by adding redundant error correcting codes to the information signal or input data. The thus processed signal is then subsequently fed to the inter-leaver block 102 in which the input data and error correction codes of the processed information signal is redistributed across several code words thereby creating a more uniform distribution of error in the event that these errors occur and, are picked up in the receiver end of the MIMO-OFDM communications system of the present invention.

The input data which, at this point consist of a serial stream of data bits is then broken-up into a two parallel spatial streams in accordance with the number of transmit antennae available on the transmitter which, in the embodiment of the present invention described herein is two. The serial input data stream is converted to a plurality of parallel data streams in accordance with the number of available transmit antennae by a serial to parallel converter block 103. The two parallel data streams output from the serial to parallel converter block 103 are then respectively fed to a first and second QAM mapping blocks respectively 104, 110 which serve to encode the first and second parallel data streams into predetermined complex-valued points in a constellation. These complex valued points each represent discrete phase and amplitude values that form a sequence of frequency domain sub-symbols that represent the data.

The outputs of the respective first and second QAM mapping blocks 104, 110 are then fed to the respective first and second Orthogonal Frequency Division Multiplexing modulator blocks 105, 111. Each OFDM modulator block consists of an Inverse Fast Fourier Transform (IFFT) block 106, 112 and a cyclic prefix block 107,113. The pilot generator block 116 serves to generate a plurality of pilot tones that are modulated and hence inserted into the MIMO-OFDM frame structure. Consequently the output of the pilot generator 116 is fed respectively to the first and second IFFT blocks 106, 112. The respective outputs of the first and second IFFT 106, 112 blocks are then correspondingly fed to a first and second cyclic prefix blocks 107, 113. The resulting output of the OFDM modulator blocks 105, 111 are respectively fed to a first and second multiplexer 108, 114 wherein a preamble as per the requirements of the IEEE 802.11n is added to the OFDM symbol outputs of the first and second OFDM modulators 105, 111. The respective MIMO-OFDM transmission frames output from the first and second multiplexer blocks 108, 114 are then up-converted by the first and second up-converting blocks 109, 115 to increase the frequency of the transmission frames before transmission to the MIMO-OFDM receiver 200.

Figure 2:
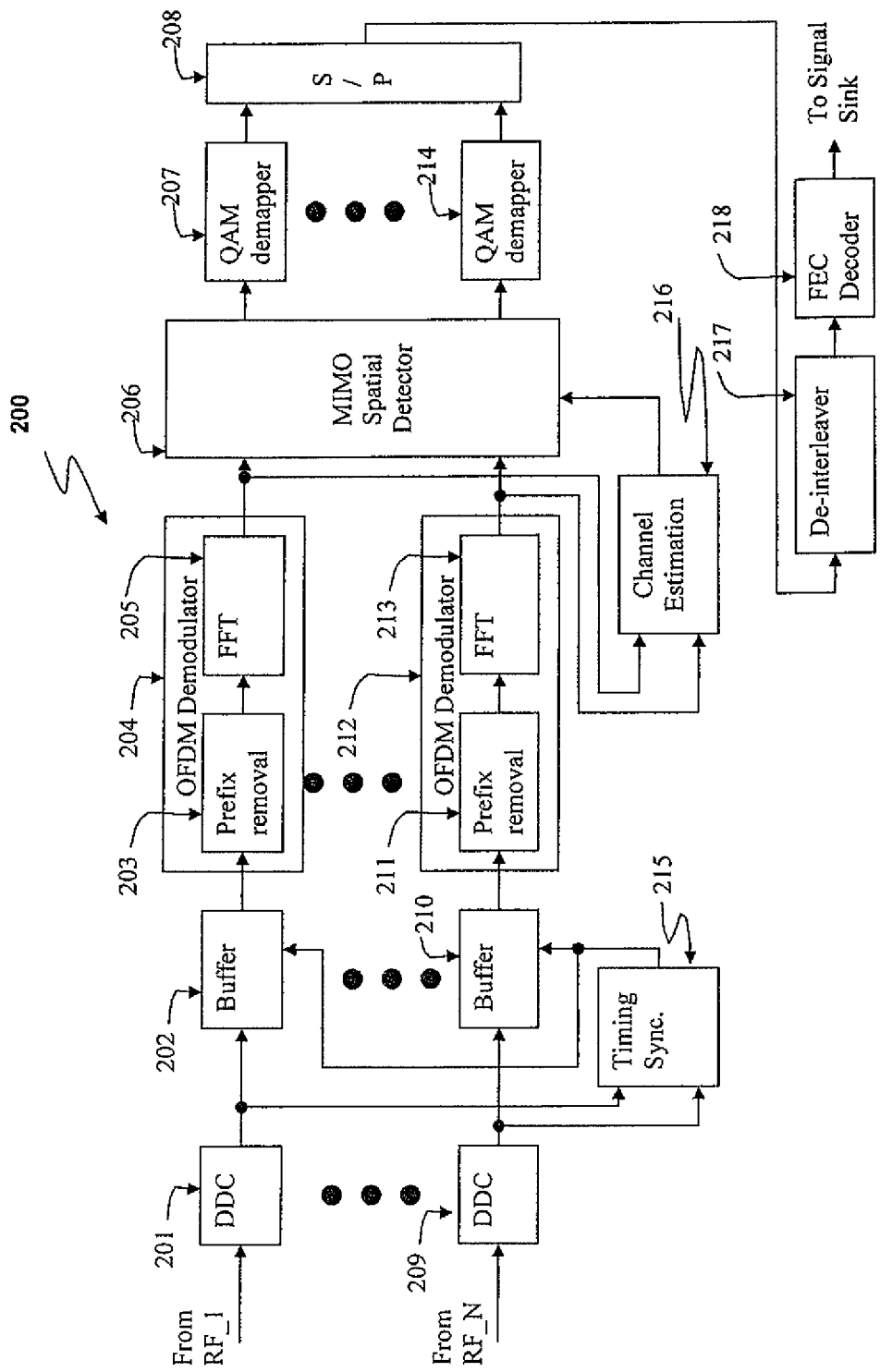
FIG. 2 is a block diagram of a MIMO-OFDM receiver system.

With reference to FIG. 2, the MIMO-OFDM receiver 200 will now be described. When a signal is transmitted from the MIMO-OFDM transmitter and is received by the receiver, the transmitted signal will first have to undergo analog to digital conversion. The MIMO-OFDM receiver of the present invention comprises of a first Digital Down Conversion block 201, a second Digital Down Conversion block 209, a first buffer block 202, a second buffer block 210, a timing synchronization block 215, a first OFDM demodulator block 204 that includes a first prefix removal block 203 and a first Fast Fourier Transform (FFT) block 205, a second OFDM demodulator block 212 that includes a second prefix removal block 211 and a second Fast Fourier Transform (FFT) block 213, a channel estimation block 216, a spatial detector block 206 and a first and second QAM de-mapping blocks 207, 214, a parallel to serial converter block 208, a de-interleaver block 217 and a FEC decoder block 218.

The MIMO-OFDM receiver of the present invention includes a first and a second OFDM demodulator 204, 212 (although in general there will be N OFDM components i.e., OFDM demodulators 204, 212, one for each receiving antenna). In the MIMO-OFDM receiver described herein, there are two receiving antennae, and hence two received signals. Each receiver antenna will receive transmitted signals from both the previously mentioned transmitter antennae of the MIMO-OFDM transmitter described herein.

Upon receipt of a plurality of MIMO-OFDM transmission signals, the plurality of received signals are converted to digital signals via an analogue to digital converter (not shown).

The two received signals as previously mentioned are initially converted to digital signals with the aid of an analogue to digital converter. Upon conversion to digital data, the two digital data streams are stored in a first and second buffer block 202, 209 to make allowance for timing synchronization. The digital down converted signals i.e. the two digital data streams received are also fed to a timing synchronization block 215, to enable a comparison to be made by the timing synchronization circuitry of the timing synchronization block 215 to thus synchronize the timing of the digital data stored in the buffer blocks 202, 210. Once synchronization of the signals has been completed, the two digital data streams are transmitted to the first and second OFDM demodulator blocks 204, 212 respectively. The OFDM demodulator blocks first remove the cyclic prefix that was appended to the individual data transmission frames in the MIMO-OFDM transmitter.

Subsequently, the two digital data streams are respectively fed to the first and second FFT blocks 205, 213 of the first and second OFDM demodulators 204, 212 respectively. The two data streams are respectively converted to the frequency domain by the respective first and second FFT blocks 205, 213. The resultant frequency domain MIMO-OFDM symbols thus obtained at the output of the respective OFDM demodulators 204, 212 are fed to a channel estimation block 216. In the channel estimation block 216 of the present invention, channel estimation to recover the original transmitted signals is carried out based on a method that utilizes the Long Training Field (LTF) portion of the MIMO-OFDM transmission frame, the pilot symbols interspersed in between the data symbols of a MIMO-OFDM data symbol of a MIMO-OFDM transmission frame and a weighting factor that is calculated based on the channel responses of the Long Training Field (LTF) symbols and pilot symbols in the MIMO-OFDM data symbol of the MIMO-OFDM transmission frame.

Upon completion of the channel estimation, the results of the channel estimation are fed to a MIMO-spatial detector block 206, to isolate the individual spatial data streams. The isolated data streams are then fed to a first and second QAM de-mapping block 207, 214 respectively. The QAM de-mapping blocks 207, 214 convert the complex-valued QAM symbols into their corresponding binary streams. The resulting parallel data streams are then fed to a Parallel to serial converter block 208 that thus serves to combine the parallel data streams into one serial data stream.

Subsequently the resulting serial data stream output from the parallel to serial block 208 is fed to a de-interleaver block 217 to de-interleave the data stream and forward error correction codes are then subsequently decoded in the FEC decoder block 218 to thus reproduce the transmitted signal at the output of the MIMO-OFDM receiver 200 of the present invention.

Figure 3:
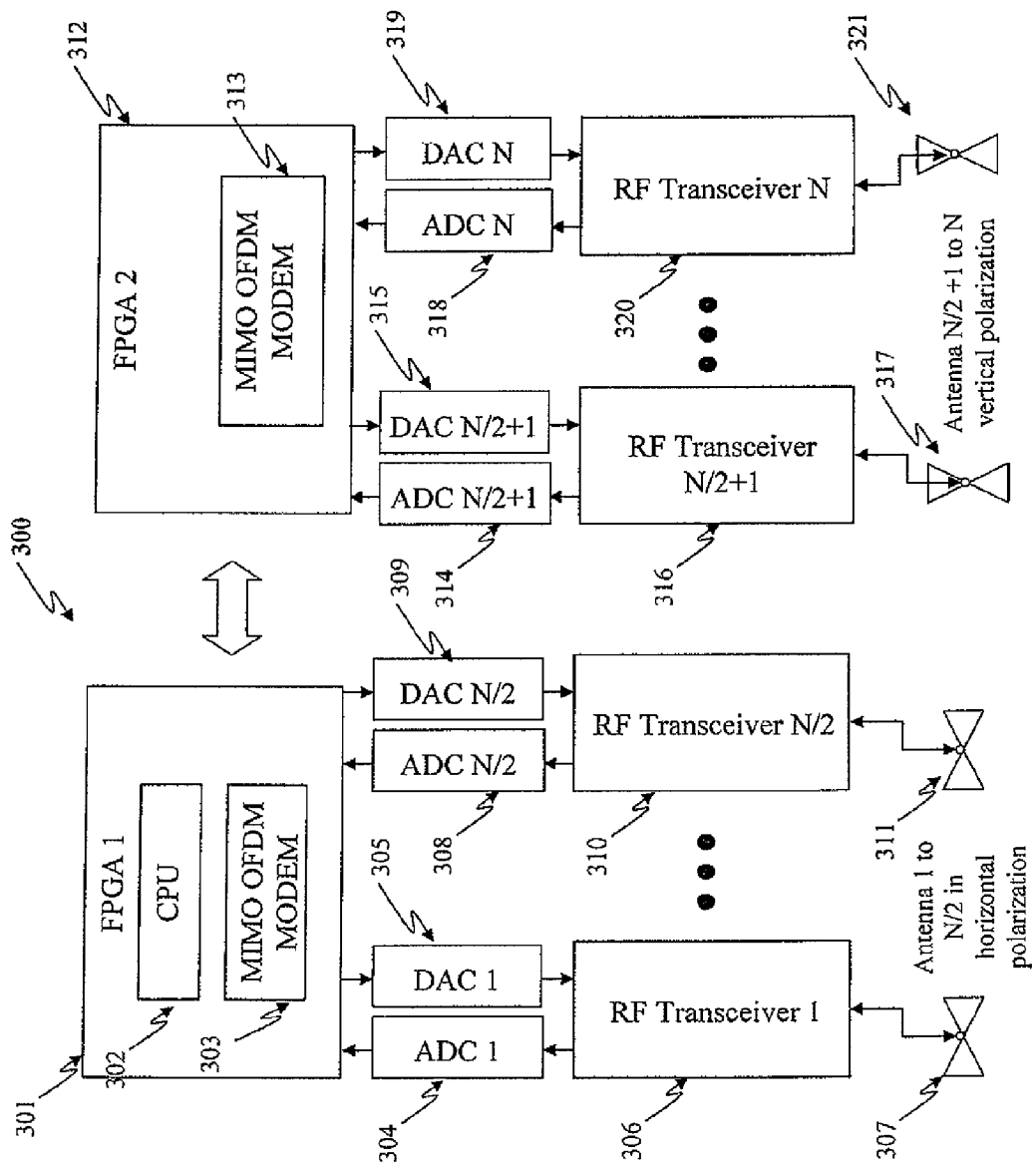
FIG. 3 is a block diagram of a dual re-configurable logic devices for MIMO-OFDM wireless communication systems.

With reference to FIG. 3, the two MIMO-OFDM modem 303 and 313 are being implemented onto two; re-configurable programmable logic device one 301 and re-configurable programmable logic device two 312 called as FPGA 1 and FPGA 2 respectively. The centralized processing unit 302 manages the data flow between both MIMO OFDM modem. Modulated MIMO OFDM signal out from the FPGA 1 is sent to digital to analogue converter one 305 to analogue converter N/2 309. Similar with modulated MIMO OFDM signal out from FPGA 2 is sent to digital to analogue converter N/2+1 315 to analogue converter N 319. Signal out from respected digital to analogue converter is sent to radio frequency transceiver 1 306 to radio frequency transceiver N/2 310 and radio frequency transceiver N/2+1 316 to radio frequency transceiver N 320. Thus, the modulated transmitted from FPGA 1 uses antenna 1 horizontal polarization 307 to antenna N/2 horizontal polarization 311 and the modulated transmitted from FPGA 2 uses antenna N/2+1 vertical polarization 317 to antenna N vertical polarization 321. Thus, transmitting process is completed. During receiving process, radio frequency signal source receive from antenna 1 307 to antenna N/2 311, and antenna N/2+1 317 to antenna N 317 are converted to baseband signal using radio frequency transceiver 1 306 to radio frequency transceiver N/2 310 and radio frequency transceiver N/2+1 316 to radio frequency transceiver N 320. Then, ADC 1 304 to ADC N/2 308, and ADC N/2+1 314 to ADC N/2 318 translate analogue signal into digital signal.

MIMO OFDM receiver 303, 313 demodulate signal into decoded data. The decoded data is managed by CPU 302 for further process.

The description to follow is based on a MIMO-OFDM transmitter 100 and receiver 200 with a N×N channel wherein the transmitter 100 has N antennas and the receiver has N reception antennas and that is further operating in the 20 MHz mode with each MIMO OFDM data symbol utilizing 52 data subcarriers, 4 pilot subcarriers and 8 null subcarriers.

The method to perform MIMO-OFDM channel estimation according to the present invention is embodied as an algorithm that resides in the channel estimator 216 of the MIMO OFDM receiver 200.

Figure 4:
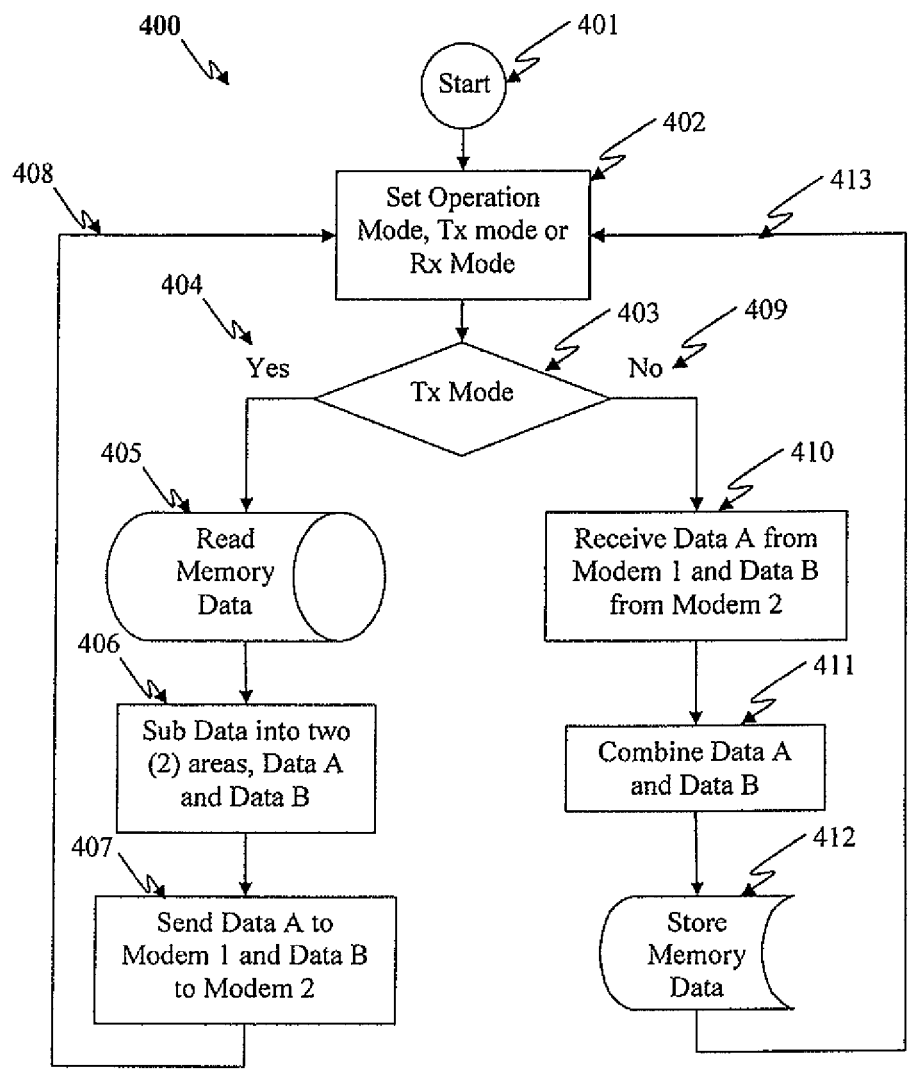
FIG. 4 is diagram illustrating the process for performing centralized processing unit for data management between the first and the second MIMO-OFDM modem.

With reference to FIG. 4, the CPU manages data flow between MIMO OFDM modem 303 and MIMO OFDM modem 313 is executed by the flow chart 400 of the present invention will now be described. This description is started by CPU will determine which operation will be executed either transmit or receive mode 402. Then, decision will be made in 403. If the transmit operation 403 is decided as Yes 404, the CPU manages to read data from memory 405. Next process is to sub-divide data into two areas 406, Data A and Data B. Data A is sent to MIMO OFDM modem 1 303 and Data B is sent to MIMO OFDM modem 2 313. Thus, it will back 408 to operation mode 402. The second option in 402 is receive operation mode. If the transmit operation 403 is decided as No 409, The CPU in 410 processes the receive data A and receive data B to the respected MIMO OFDM modem 1 303 and MIMO OFDM modem 2 313. Then, follow to combine receive Data A and Data B in 411. The combined receive data will be stored in memory data in 412. It will end the receive operation and start again in 402. The process is repeated.

Having described the invention, the following is claimed:

1. A physical layer of a Multiple Input Multiple Output Orthogonal Frequency Division Multiplexing (MIMO OFDM) wireless communication system including two (2) Re-configurable Programmable Logic (FPGA) devices and a double Multiple Input Multiple Output Orthogonal Frequency Division Multiplexing (MIMO OFDM) modem for supporting transmitting and receiving via a plurality of dual-polarized antennas, wherein a Re-configurable Programmable Logic device 1 (FPGA 1) includes a centralized-processing unit (CPU) or any other controller that manages communication between a Multiple Input Multiple Output Orthogonal Frequency Division Multiplexing (MIMO OFDM) Modem 1 and a Multiple Input Multiple Output Orthogonal Frequency Division Multiplexing (MIMO OFDM) Modem 2, the physical layer further comprising:
   a plurality of Orthogonal Frequency Division Multiplexing (OFDM) modulators, each modulator including:
      an Inverse Fast Fourier Transform (IFFT) block that modulates a phase and an amplitude of a sub-carrier in accordance to an incoming data stream corresponding to a spatial stream of a Multiple Input Multiple Output Orthogonal Frequency Division Multiplexing (MIMO-OFDM) transmit antenna; and
      a cyclic prefix block that adds a cyclic prefix to a resultant data of the Inverse Fast Fourier Transform (IFFT) block to obtain a time domain Orthogonal Frequency Division Multiplexing (OFDM) symbol; and
   a plurality of Orthogonal Frequency Division Multiplexing (OFDM) demodulators, each demodulator including:
      a Prefix removal block that removes or discards the cyclic prefix from a transmitted time domain Orthogonal Frequency Division Multiplexing (OFDM) symbol; and
      a Fast Fourier Transform (FFT) block that demodulates the transmitted time domain Orthogonal Frequency Division Multiplexing (OFDM) symbol into a Multiple Input Multiple Output Orthogonal Frequency Division Multiplexing (MIMO-OFDM) frequency domain symbol.

2. A physical layer of a Multiple Input Multiple Output Orthogonal Frequency Division Multiplexing (MIMO OFDM) wireless communication system including two (2) Re-configurable Programmable Logic (FPGA) devices, and a double Multiple Input Multiple Output Orthogonal Frequency Division Multiplexing (MIMO OFDM) modem for supporting transmitting and receiving via a plurality of dual-polarized antennas, wherein a Re-configurable Programmable Logic device 1 (FPGA 1) includes a centralized-processing unit (CPU) or any other controller that manages communication between a Multiple Input Multiple Output Orthogonal Frequency Division Multiplexing (MIMO OFDM) Modem 1 and a Multiple Input Multiple Output Orthogonal Frequency Division Multiplexing (MIMO OFDM) Modem 2, each of the two (2) Re-configurable Programmable Logic (FPGA) devices includes a receiver comprised of:
   a channel estimator block that implements a channel estimation algorithm that is based on:
      a plurality of Long Training Field (LTF) symbols as outlined in IEEE 802.11n draft;
      a plurality of pilot symbols as outlined in the IEEE 802.11n draft; and
      a Forward Error Correcting (FEC) block;
   an inter-leaver block;
   a Serial to Parallel conversion block;
   a plurality of Quadrature Amplitude Modulation (QAM) mapping blocks that map an individual parallel data stream of bits onto Quadrature Amplitude Modulation (QAM) symbols;
   a plurality of Orthogonal Frequency Division Multiplexing (OFDM) modulators;
   a pilot generator that serves to insert a plurality of pilot tones in a space-time domain of Orthogonal Frequency Division Multiplexing (OFDM) symbols;
   a preamble generator block that generates a preamble according to requirements of the IEEE 802.11n standard;
   a plurality of multiplexer blocks that serve to add in a time domain the preamble generated by the preamble generator block to the Orthogonal Frequency Division Multiplexing (OFDM) symbols that are obtained from the plurality of Orthogonal Frequency Division Multiplexing (OFDM modulator blocks for each individual spatial stream of a Multiple Input Multiple Output Orthogonal Frequency Division Multiplexing (MIMO-OFDM) transmitter; and
   a plurality of Digital Up Sampling blocks.

3. A physical layer of a Multiple Input Multiple Output Orthogonal Frequency Division Multiplexing (MIMO OFDM) wireless communication system including two (2) Re-configurable Programmable Logic (FPGA) devices and a double Multiple Input Multiple Output Orthogonal Frequency Division Multiplexing (MIMO OFDM) modem for supporting transmitting and receiving via a plurality of dual-polarized antennas, wherein a Re-configurable Programmable Logic device 1 (FPGA 1) includes a centralized-processing unit (CPU) or any other controller that manages communication between a Multiple Input Multiple Output Orthogonal Frequency Division Multiplexing (MIMO OFDM) Modem 1 and a Multiple Input Multiple Output Orthogonal Frequency Division Multiplexing (MIMO OFDM) Modem 2, the physical layer further comprising:
- a plurality of Orthogonal Frequency Division Multiplexing (OFDM) modulators, each modulator including:
  - an Inverse Fast Fourier Transform (IFFT) block that modulates a phase and an amplitude of a sub-carrier in accordance to an incoming data stream corresponding to a spatial stream of a Multiple Input Multiple Output Orthogonal Frequency Division Multiplexing (MIMO-OFDM) transmit antenna; and
  - a cyclic prefix block that adds a cyclic prefix to a resultant data of the Inverse Fast Fourier Transform (IFFT) block to obtain a time domain Orthogonal Frequency Division Multiplexing (OFDM) symbol; and
- a receiver comprised of:
  - a plurality of digital down conversion blocks;
  - a timing synchronization block that serves to generate an index to denote a start of an information packet;
  - a plurality of buffer blocks;
  - a plurality of Orthogonal Frequency Division Multiplexing (OFDM) demodulator blocks;
  - a channel estimation block having inputs connected to respective outputs of the plurality of Orthogonal Frequency Division Multiplexing (OFDM) demodulator blocks and that feeds outputs, in combination with outputs of the plurality of Orthogonal Frequency Division Multiplexing (OFDM) demodulator blocks, into a Multiple Input Multiple Output (MIMO) spatial detector block;
  - the Multiple Input Multiple Output (MIMO) spatial detector block serves to detect a plurality of spatial streams transmitted which further compensates an effect of channel impairment which has been estimated by the channel estimation block;
  - a plurality of Quadrature Amplitude Modulation (QAM de-mapper blocks that respectively convert a plurality of complex-valued Quadrature Amplitude Modulation (QAM symbols into corresponding binary data sequences;
  - a parallel to serial data conversion block that converts a plurality of parallel spatial streams into a serial stream of data bits;
  - a de-interleaver block; and
  - a Forward Error Correction (FEC) decoder.

* * * * *